United States Patent [19]

Retallack et al.

[11] Patent Number: 4,493,949

[45] Date of Patent: Jan. 15, 1985

[54] PARALLEL OPERATION OF TELEPHONE EQUIPMENT ON A DIGITAL LOOP

[75] Inventors: Laurence J. Retallack, Ottawa; Cornelis W. Reedyk, Nepean, both of Canada

[73] Assignee: Northern Telecom Limited, Montreal, Canada

[21] Appl. No.: 242,843

[22] Filed: Mar. 12, 1981

[51] Int. Cl.³ ............................................. H04M 3/56
[52] U.S. Cl. ................................... 179/18 BC; 179/30
[58] Field of Search ............ 179/1 CN, 1 HF, 18 BC, 179/1 VC, 2 DP, 17 B, 30-33; 370/62, 67, 85, 89, 110.1; 340/825.38, 825.39

[56] References Cited

U.S. PATENT DOCUMENTS

| | | | |
|---|---|---|---|
| 3,735,359 | 5/1973 | Wagner | 179/1 CN |
| 3,970,797 | 7/1976 | Johnson et al. | 179/1 CN X |
| 3,984,643 | 10/1976 | Inrig et al. | 179/18 BC |
| 4,007,338 | 2/1977 | McLaughlin | 179/18 BC |
| 4,160,878 | 7/1979 | Hirschmann et al. | 179/18 BC |
| 4,289,932 | 9/1981 | Reed | 179/1 CN X |
| 4,360,910 | 11/1982 | Segal et al. | 179/18 BC X |
| 4,368,358 | 1/1983 | Herschtal | 179/17 B |

FOREIGN PATENT DOCUMENTS 23403  7/1980  European Pat. Off.
2917570  4/1979  Fed. Rep. of Germany

OTHER PUBLICATIONS

Electronic Design's Telecom Design 1980, pp. 249-294, Melville (USA); B. Karasch et al., "A Solid State Line Card Using LSI Components", Paragraph II.C.3.

Primary Examiner—Gene Z. Rubinson
Assistant Examiner—W. J. Brady
Attorney, Agent, or Firm—Robert C. Hogeboom

[57] ABSTRACT

Disclosed is a digital station apparatus, such as a digital telephone set, capable of being operated in parallel on a subscriber's digital loop (e.g. in an extension mode) without the need to route all the PCM signals to common equipment. Only one of the parallel sets is active at a time; all the others are passive. In the passive state the telephone set receives only, and does not transmit. It monitors its own signal magnitude relative to the signal magnitude produced by the active "extension" on the same digital loop. When its own signal magnitude has satisfied a comparison criterion, then that passive set becomes active and both transmits and receives, while all other sets on the loop are passive.

24 Claims, 11 Drawing Figures

FIG. 11

| INPUTS | | | | PRESENT STATE | | NEXT STATE | | OUTPUTS | | | | |
|---|---|---|---|---|---|---|---|---|---|---|---|---|
| OFF-ON | GOT | GOL | DEC | Q FLIP-FLOP 100 | Q FLIP-FLOP 113 | Q FLIP-FLOP 100 | Q FLIP-FLOP 113 | ENC | LTN | REQ | TLK | SIGNIFICANCE |
| 1 | 0 | 0 | 0 | 0 | 0 | 0 | 0 | 0 | 1 | 1 | 1 | OFF-HOOK MODE (IDLE) |
| 1 | 0 | 1 | X | 0 | 0 | 1 | 0 | 1 | 0 | 1 | 1 | GO INTO PASSIVE MODE |
| 1 | 1 | 0 | X | 0 | 0 | 0 | 1 | 0 | 1 | 1 | 0 | GO INTO ACTIVE MODE |
| 1 | X | X | 1 | 1 | 0 | 1 | 1 | 0 | 1 | 0 | 1 | REQUEST TO GO INTO ACTIVE MODE |
| 1 | 1 | 0 | X | 1 | 0 | 1 | 0 | 0 | 1 | 1 | 0 | GO INTO ACTIVE MODE |
| 1 | 0 | 1 | X | 0 | 1 | 0 | 1 | 1 | 0 | 1 | 1 | GO INTO PASSIVE MODE |
| 1 | X | 1 | X | 1 | 1 | 0 | 1 | 0 | 1 | 1 | 1 | TRANSIENT MODE |
| 1 | 0 | 1 | X | 1 | 0 | 0 | 1 | 1 | 0 | 1 | 1 | GO INTO PASSIVE MODE |
| 0 | X | X | X | X | X | 0 | 0 | 0 | 1 | 1 | 1 | ON-HOOK MODE |

NOTE: 1 — INDICATES A LOGIC 1 STATE
0 — INDICATES A LOGIC 0 STATE
X — INDICATES THAT IT IS IRRELEVANT WHETHER THE STATE IS A LOGIC 1 OR 0.

PARALLEL OPERATION OF TELEPHONE EQUIPMENT ON A DIGITAL LOOP

The present invention relates generally to digital telephone station apparatus capable of being operated in parallel (e.g. extension telephones) and more particularly to digital telephone sets capable of being operated in parallel on a subscriber's digital loop.

BACKGROUND OF THE INVENTION

In the North American telephone system it is common practice to allow two or more telephone sets to operate in parallel, as extensions, simultaneously on the same analogue telephone line. When analogue voice transmission is used on the telephone line (i.e. subscriber loop), the signals from the two or more extensions (i.e. telephone sets) are added linearly simply due to the fact that the two or more extensions are connected in parallel across the same telephone line.

When digital signals are employed in the subscriber loop, the installation of extension telephone sets is not as simple as it was with analogue signals. In digital telephony, the analogue (e.g. voice) signals are encoded in a non-linear fashion such as in the nu-law pulse code modulation (PCM). Consequently it is not possible to add the digital signals directly, as such practice results in distortion of the signals.

In the prior art, when digital transmission was employed and when two or more digital signals were to be combined, as in a conference circuit, the digital signals were routed to a common circuit (e.g. a conference circuit or conference bridge) usually provided as common equipment in a central office.

There are many such conference circuits described in the art. Three of these prior circuits are briefly described below.

U.S. Pat. No. 4,160,878 dated July 10, 1979 to P. Hirschmann and E. Hoefer describes a circuit in which digital signals of all subscribers are consecutively converted into analog signals and an analog summation signal is formed therefrom. This summation signal is again converted back into a digital signal (from the abstract of the patent).

U.S. Pat. No. 4,007,338 dated Feb. 8, 1977 to D. W. McLaughlin describes a purely digital conferencing circuit that is based upon comparing the magnitude of the PCM digital samples. As stated at column 2, lines 30 to 44 of the patent "the operation is such that two words [for a three party conference] corresponding to two channels are read from the information memory every time slot, and after proper comparison, the largest sample is transmitted to the third channel. In other words, assuming, for example, that channels 3, 5 and 9 are engaged in a 3-way conference, during the channel 3 time slot, the samples from channel 5 and channel 9 are read and compared, and the larger of the two samples is transmitted to channel 3. Subsequently, during the channel 5 time slot, the samples from channel 3 and channel 9 are read and compared, and the larger of the two samples is transmitted. During the channel 9 time slot, the operation is repeated, with the largest of the channel 3 and 5 samples being transmitted."

U.S. Pat. No. 3,984,643 dated Oct. 5, 1976 to S. A. Inrig and A. S. J. Chapman describes a conferencing system in which, for an n-party conference, the PCM words for each of the n channels involved are linearized and then summed. The PCM word (linearized) from a particular conferee is then subtracted from the sum, and that result (i.e. the sum of n−1 conferees) is then converted back to PCM and sent to that particular conferee (see column 4, lines 7 to 30 of the patent).

The above three patents are similar in that the conferencing function in all three is provided by routing all the digital (PCM) signals to common equipment at one common location (e.g. at a telephone switching office). This need for routing all the PCM signals to common equipment at a common location can present problems when it is necessary to provide extension service capability for a large number of subscribers.

SUMMARY OF THE INVENTION

The present invention provides a digital telephone set capable of being operated in parallel (e.g. as an extension or as a party line connection) on a subscriber's digital loop without the need of routing all the PCM signals to common equipment. This paralleling function operates without the need for additional timeslots, and in the preferred embodiment, without the need for additional transmission paths.

The present invention works as follows, using a two telephone set extension connection as an exemplary embodiment. The subscriber's digital telephone loop comprises one receive bus and one transmit bus (or alternately, separate receive and transmit channels on a single bi-directional bus). Both telephone sets are responsive to the digital signals appearing on the receive bus; a digital to analogue converter in each telephone set transforms the digital signal on the receive bus to an analogue signal. Each telephone set has two connections to the transmit bus; each connection being controlled by an on-off switch such that only one connection (per telephone set) to the transmit bus is possible, at any one time. One of the two telephone sets, at any given time, is active and is capable of transmitting on the transmit bus (via its second on-off switch that is "on", or "closed"). The other telephone set is passive and cannot transmit on the transmit bus at that time (since its second on-off switch is open and has that path disconnected) but rather sums the signal received on the transmit bus (via its first on-off switch which is closed) with the signal received on the receive bus in either an analogue form or in a linearized digital form after each signal has been converted from the compressed PCM format. Control equipment, situated within each telephone set, functions in co-operation with the switching office (from which the loop originates and sometimes referred to as "common equipment") to control which set will be the active set and which will be the passive set; this control equipment will be explained later in greater detail. Note that only one set at any one time can be the active set, while one or more sets can be the passive set at any one time. Note also that each telephone set is capable of receiving signals from the receive bus while it is off-hook but only one set, at any given time, can send signals to the transmit bus.

Stated in other terms, the present invention is a digital station apparatus for connection to a subscriber's digital telephone loop, the apparatus characterized by: means for allowing the operation of two or more apparatus, in parallel, on the digital loop.

Stated in yet other terms, the present invention is a digital station apparatus for connection to a telephone subscriber's digital loop, having at least a first receive channel for information and a second receive channel for signalling from common equipment, and having at least a first transmit channel for information and a second transmit channel for signalling to the common equipment, the apparatus characterized by: means for allowing the operation of two or more apparatus, in parallel, on the digital loop such that no more than said first and second receive channels and no more than said first and second transmit channels are employed.

Stated in still other terms, the present invention is a digital station apparatus for connection to a subscriber's digital telephone loop, having both receive channels and transmit channels, the apparatus characterized by: terminal means for receiving digital signals from the receive channels; first switch means for selectively passing first digital signals from a first channel of the transmit channels; second switch means for selectively passing second digital signals to said first channel of the transmit channels such that the first and second switch means operate in unison and one switch means is open when the other switch means is closed; and a comparison means for comparing the first digital signals and the second digital signals, when the first switch means is closed, and for producing a signal indicative of said comparison.

Stated in yet again different terms, the present invention is a digital telephone multi-set system for connection to a subscriber's digital telephone loop, having both receive channels and transmit channels, the system comprising: at least two digital telephone apparatus for connection to said telephone loop; one digital telephone apparatus being active for producing a transmit signal on at least a first channel of the transmit channels and for receiving a receive signal from at least a first channel of the receive channels; the remaining digital telephone apparatus being passive for receiving both the transmit signal from the first channel of the transmit channels, and the receive signal from the first channel of the receive channels; and all the telephone apparatus including control means for altering the operation of the telephone apparatus so that any one of the telephone apparatus can function as the active digital telephone apparatus and the remaining digital telephone apparatus can function as the passive digital telephone apparatus.

Stated in still other terms, the present invention is a method of controlling each of a plurality of telephone apparatus connected to a subscriber's digital telephone loop, having both receive channels and transmit channels, the method, at each apparatus, comprising the steps of: receiving digital signals from the receive channels; selectively passing first digital signals from a first channel of the transmit channels to the apparatus; selectively passing second digital signals from the apparatus to the first channel of the transmit channels; selectively comparing the first digital signals and the second digital signals and producing a signal indicative of the comparison.

Stated once again in different terms, the present invention is a method of controlling a plurality of telephone apparatus connected to a subscriber's digital telephone loop, having both a receive bus and a transmit bus, and wherein at any given time, one apparatus at most is active and the remainder of the apparatus are passive, the method comprising the steps of: receiving digital signals from the receive bus at each telephone apparatus; passing digital signals from a first channel of the transmit bus to all the passive apparatus; passing digital signals produced by the active apparatus to the first channel of the transmit bus; comparing, at each passive apparatus, the digital signals from the first channel of the transmit bus and digital signals produced by that particular passive apparatus, and selectively transmitting a digital signal on a second channel of the transmit bus indicating the result of the comparison.

BRIEF DESCRIPTION OF THE DRAWINGS

The invention will now be described in more detail with reference to the accompanying drawings, wherein like parts in each of the several figures are identified by the same reference character, and wherein:

FIG. 11 is a chart depicting the states of signals and flip-flops in FIG. 6.

DETAILED DESCRIPTION

Figure 1:
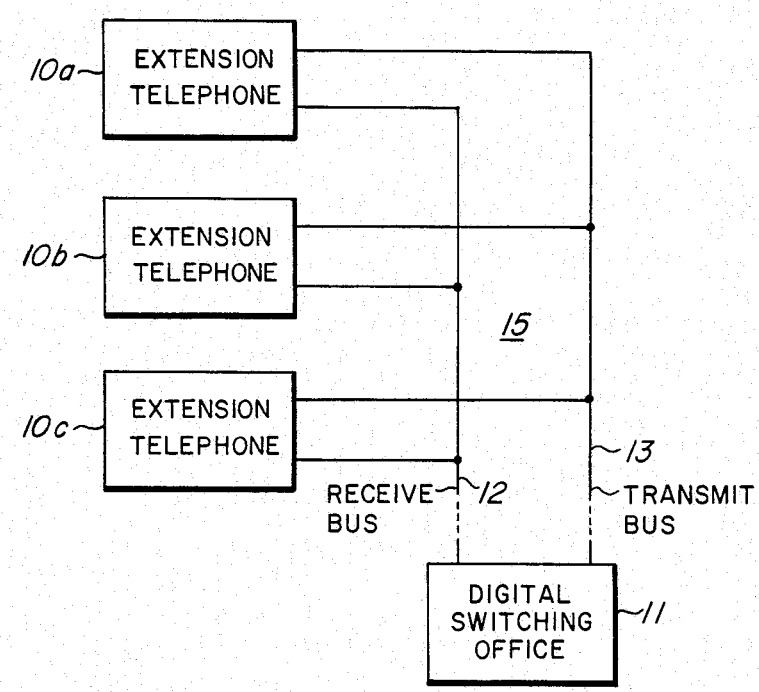
FIG. 1 is a simplified block diagram depicting three telephone sets, constructed according to the present invention, connected to a single subscriber's digital loop.

FIG. 1 depicts telephone sets 10a, 10b, and 10c (referred to collectively as telephone sets 10) constructed according to the present invention and connected in parallel across a subscriber's digital loop referenced by the numeral 15. Digital loop 15 comprises receive TDM (Time Division Multiplex) bus 12 and transmit TDM bus 13, connected to digital switching office 11 (e.g. a Northern Telecom DMS-100 TM), also referred to as common equipment.

Figure 2:
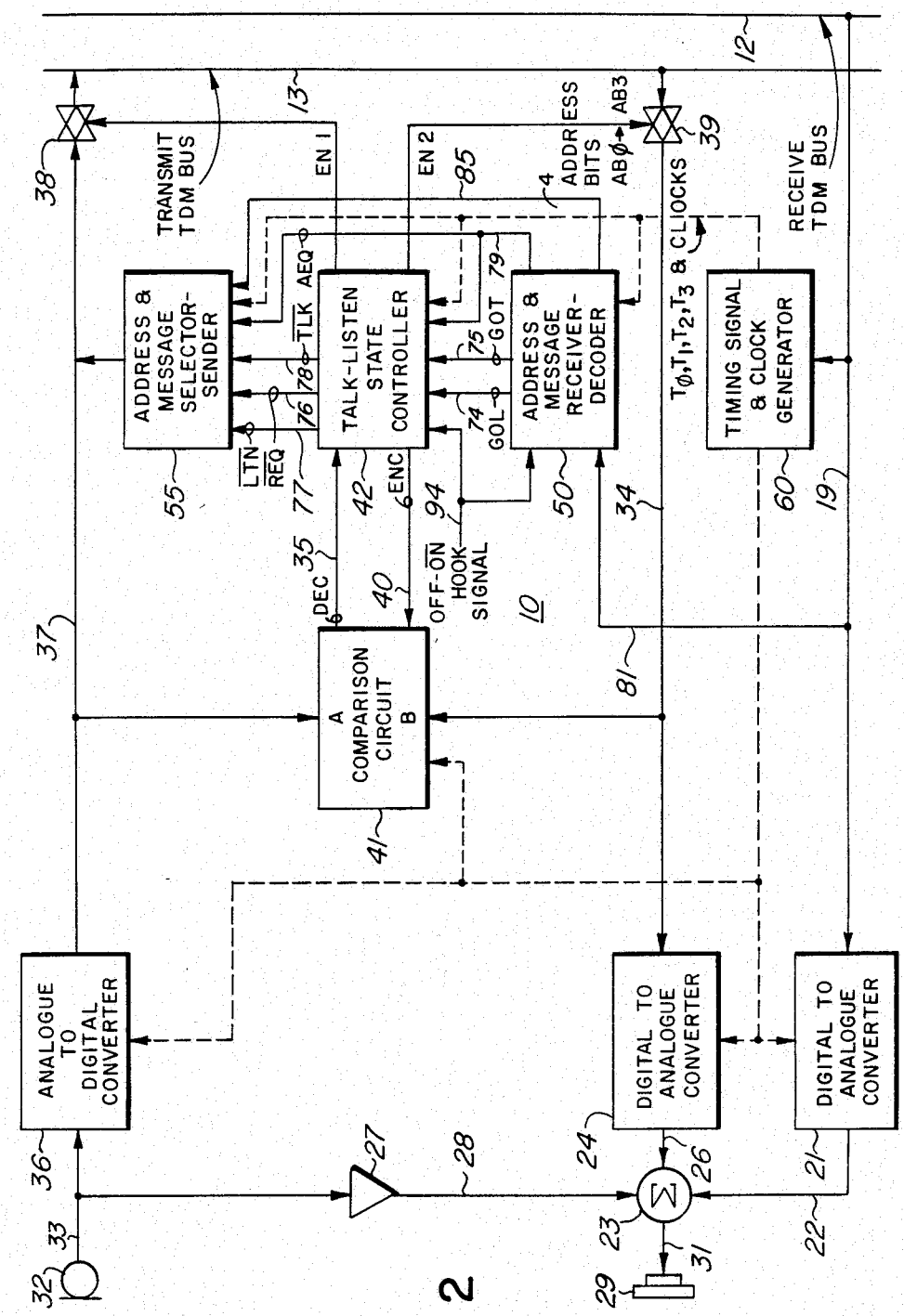
FIG. 2 is a simplified block diagram depicting the circuitry of the telephone sets of FIG. 1.

FIG. 2 depicts the circuitry, in block form, of one telephone set 10. Note that the dialling circuitry has been eliminated from FIG. 2 in order to simplify the description of the invention and in order to keep the drawings uncluttered. The dialling circuitry is well known in the art and is not part of the present invention.

Telephone set 10 receives digital signals on line 19, from receive bus 12; these digital signals include both voice information encoded as pulse code modulation (PCM) and signals for control and signalling purposes. Digital to analogue converter 21 is responsive to the appropriate PCM signals and produces an analogue output on line 22. The analogue signal on line 22 is applied to summing circuit 23 as are the output signals from digital to analogue converter 24 on line 26, and the output from operational amplifier 27 on line 28. The output of summing circuit 23 is applied to headphone 29 via line 31.

The purpose of amplifier 27 is to provide "sidetone". It does this by passing a small portion of the output signal from microphone 32, on line 33, to summing circuit 23. The purpose of digital to analogue converter 21 is, as previously mentioned, to convert the appropriate digital signals appearing on receive TDM bus 12 into analogue signals on line 22. Note that the digital signals on receive bus 12 are solely from digital switching office 11, FIG. 1 (and not from the other telephone sets 10). The purpose of digital to analogue converter 24 is to convert the digital signals appearing on line 34 into analogue signals on line 26 (this will be more completely described later). Summing circuit 23, of course, sums algebraically the signals on its three inputs (namely on lines 22, 26 and 28) and applies the resultant sum to headphone 29 via line 31.

Telephone set 10 produces a signal on transmit bus 13. Analogue to digital converter 36 receives analogue signals from microphone 32, via line 33, and transforms them into digital PCM signals on line 37. Switch 38, when closed, permits the signal on line 37 to be passed to transmit bus 13. Note that switch 39 is open, in telephone set 10 (when switch 38 is closed), so that signals from transmit bus 13 are not passed to line 34. Note also that switches 38 and 39 function such that when one is open the other is closed.

Talk-listen state controller 42 determines whether or not telephone set 10 is to "talk" (i.e. to be active) or to "listen" (i.e. to be passive). Note that all sets 10 will receive signals from receive TDM bus 12 all the time (i.e. signals received from switching office 11) and the "listening" mentioned above refers to listening to other telephone sets 10 on loop 15.

Stated in simplistic terms, state controller 42 is responsive both to signals from comparison circuit 41 and from address and message receiver-decoder 50. The function of receiver-decoder 50 is to receive control signals (time domain multiplexed with the PCM signals on bus 12) from switching office 11 (FIG. 1). These command signals consist of the usual commands common in digital telephony (e.g. ringing signals, timeslot assignment, etc.) and also include two special signals for this application. The first special signal (GOL, on line 74) indicates that another telephone set 10 is requesting to enter the active mode and the subject telephone set 10 is being ordered into the passive mode, and the second special signal (GOT, on line 75) is an acknowledgement signal ordering the subject set 10 to enter the active mode. As long as only one set 10 is "off-hook", it is enabled in the active aode by switching office 11. Note that the convention used throughout this specification is that a signal with a line over it (e.g. $\overline{REQ}$) indicates that the signal is "low" (i.e. logic 0) when true and "high" (i.e. logic 1) when false. A signal without a line over it is "high" (i.e. logic 1) when true and "low" (i.e. logic 0) when false.

When telephone set 10 is in the passive mode (i.e. "listening" only), comparison circuit 41 monitors the magnitude of the PCM signals appearing on its A and B inputs. The PCM signals appearing at the A input of comparison circuit 41 are PCM signals that originated from microphone 32. The PCM signals appearing at the B input of comparison circuit 41 are PCM signals received from transmit TDM bus 13, when switch 39 is closed. Note that the PCM signals appearing on bus 13 are signals from the telephone sets 10 connected to loop 15. Note also, that switches 38 and 39 are not both closed simultaneously; when switch 38 is open switch 39 is closed, and vice-versa.

Address and message selector-sender 55 functions to send command signals from telephone set 10 to switching office 11 (FIG. 1), via line 37 and transmit TDM bus 13. These command signals consist of the usual commands common in digital telephony (e.g. "off-hook" or request for service, dialling codes, etc.) and also include three special signals for this application. The first special signal ($\overline{REQ}$, on line 76) indicates that the subject telephone set 10 is requesting to enter the active mode and the other telephone sets 10 on loop 15 are being ordered into the passive mode. The second special signal ($\overline{LTN}$, on line 77) is a status signal, sent when the subject telephone set 10 is acknowledging that a command from switching office 11 to enter the passive mode was received and executed. The third special signal ($\overline{TLK}$, on line 78) is a status signal acknowledging GOT, and informing switching office 11 that the subject telephone set 10 is in the active mode.

Figure 8:
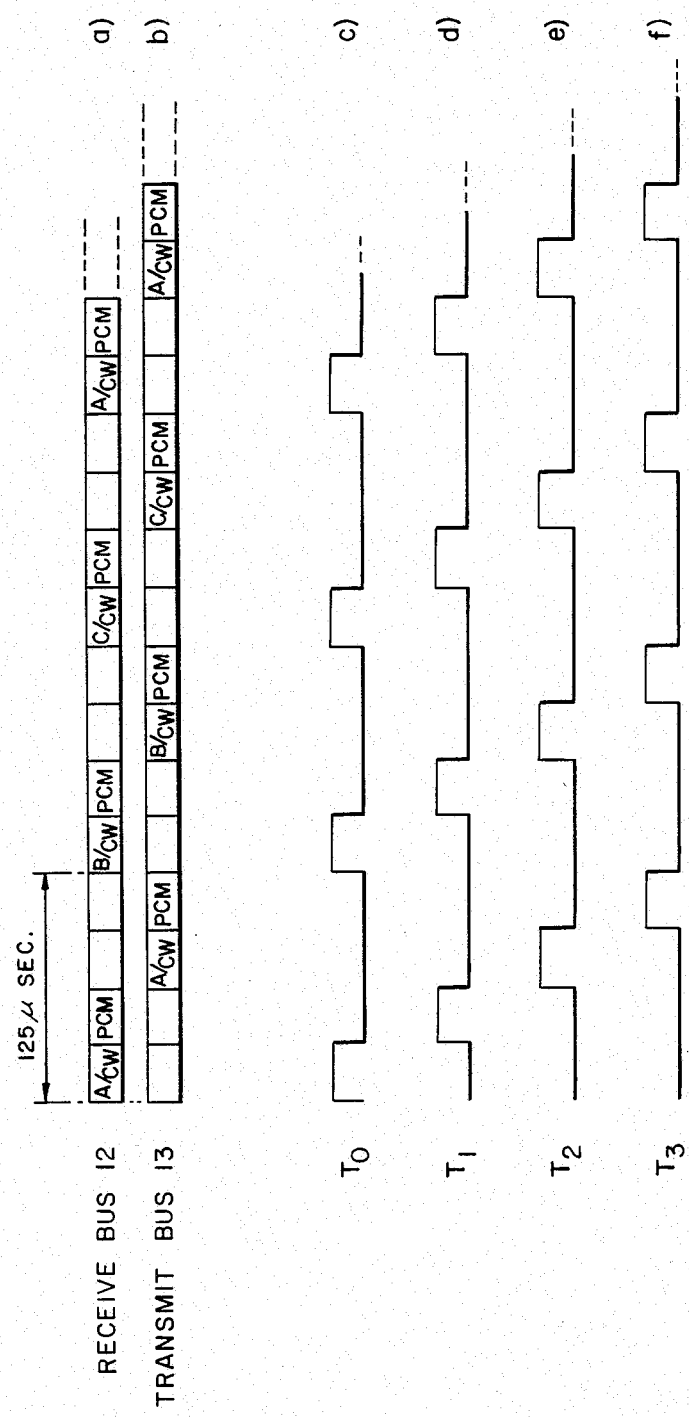
FIG. 8 is a timing diagram showing various clock signals.

Timing signal and clock generator 60 produces the signals depicted in FIG. 8. The reference timing for these signals is derived from the bit stream appearing on receive TDM bus 12, via line 19. As the generation of these signals is well known, the circuitry of generator 60 will not be described in greater detail.

Figure 3:
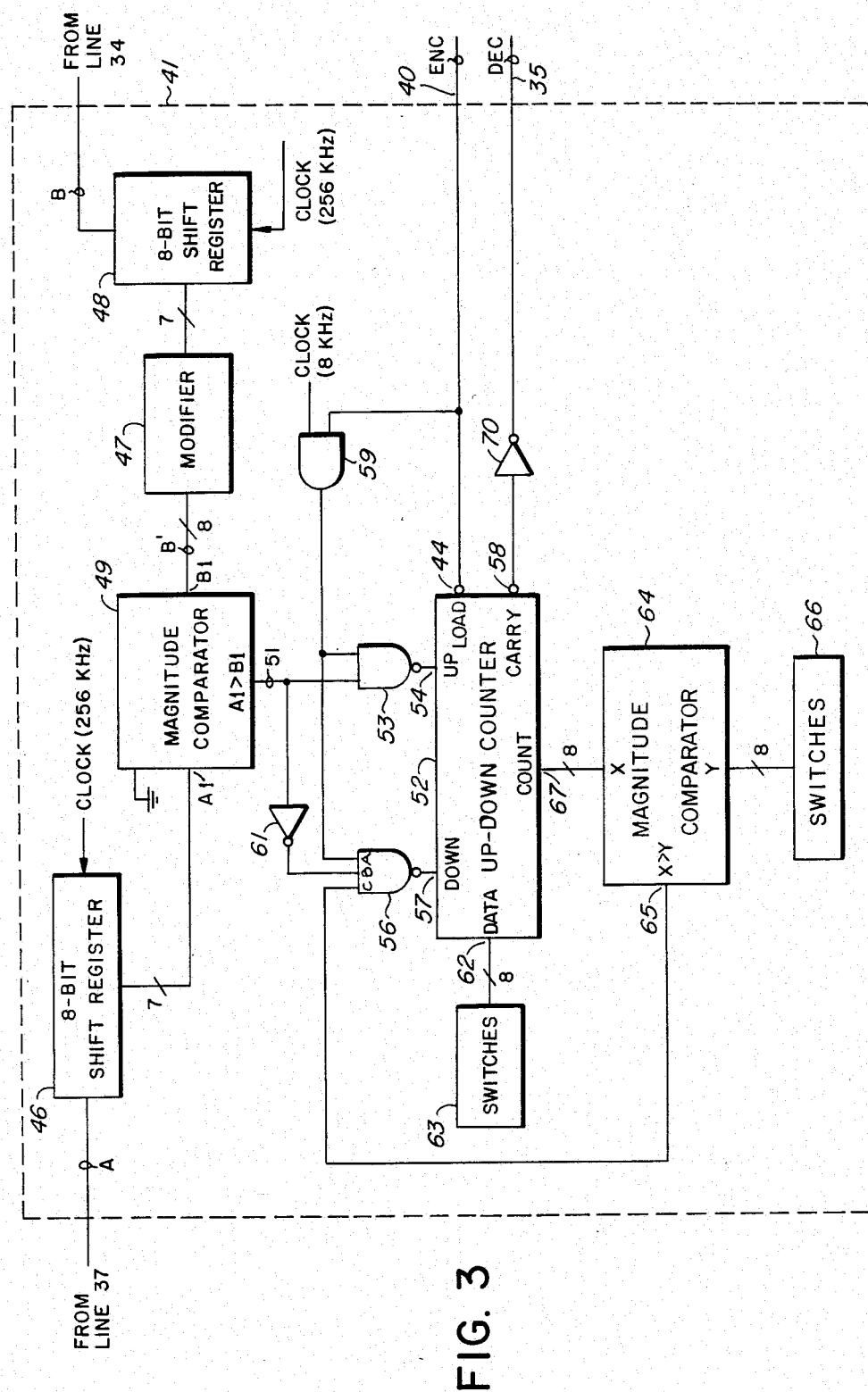
FIG. 3 is a simplified block diagram depicting the circuitry of the comparison circuit in FIG. 2.

Looking at the circuitry of telephone set 10 in more detail, comparison circuit 41 is depicted in FIG. 3, and the components thereof are interconnected as shown, and attention is directed thereto.

Eight-bit shift register 46 receives a serial input of digital signals (PCM signal A) from line 37 and outputs, in parallel format, seven digital bits to magnitude comparitor 49 (note that the eighth or sign bit is not sent to comparator 49). Similarly, eight-bit shift register 48 receives a serial input of digital signals (PCM signal B) from transmit bus 13 (via switch 39, when closed), and outputs, in parallel format, seven digital bits to modifier 47; i.e. signal B less its sign bit. Modifier 47 functions to increase the value of signal B (e.g. by 10db) to produce an augmented signal B'. The details of modifier 47 are described later, in conjunction with FIG. 4. The output of modifier 47 is applied, in parallel format, to magnitude comparator 49.

Magnitude comparator 49 is comprised of two model 7485 comparators by Texas Instruments, connected so as to compare eight bits on one of its inputs (A1) with eight bits on its other input (B1). Note that the signal A, input to comparator 49, represents the magnitude bits of a PCM (pulse code modulation) signal; i.e. an 8-bit PCM word less the sign bit. The eighth bit of input A1 is supplied with a constant logic 0 signal. If $|A|$ is greater than $|B'|$, (i.e. A1>B1) then output signal 51 from comparator 49 is a logic 1; otherwise it is a logic 0.

Assume for the moment that A1>B1. Therefore output signal 51 from comparator 49 is a logic 1. Up-down counter 52 consists of two Texas Instruments SN74193 4-bit counters connected so as to provide an 8-bit counter, capable of counting to 255. NAND gate 53 feeds the count-up input 54 of counter 52 and NAND gate 56 feeds the count-down input 57 of the counter. Carry output 58 of counter 52 is a logic 1 (when no carry is present); this logic signal on output 58 is applied to inverter 70, the output of which is signal DEC (on line 35). A clock signal (8 KHz) is applied to one input of AND gate 59 and signal ENC (on line 40) is applied to the other input of gate 59. The result is an output signal from AND gate 59 that is the same as the clock signal when signal ENC is a logic 1, and is a logic 0 otherwise.

NAND gate 53 has a logic 1 (signal 51) on one of its inputs (when A1>B1) and has a logic signal (from AND gate 59) alternating between a logic 1 and a logic 0 on its other input. This results in a logic signal being applied to input 54 of counter 52 that alternates between a logic 1 and a logic 0. Inverter 61 produces a logic 0 signal to be applied to one input of NAND gate 56 and consequently the output of NAND gate 56 applied to down input 57 is a logic 1. Since down input 57 has a logic 1 and up input 54 has an input alternating between logic 1 and logic 0, counter 52 counts up. Data inputs 62 (of which there are eight) determines at which number up-down counter 52 begins counting; in the embodiment of FIG. 2 they are fed with the value 127 in binary format (i.e. 128 down from the maximum count of 255). This function is performed by eight switches, indicated collectively as switches 63, which are each SPDT (single pole double throw) switches capable of connecting either to ground potential (i.e. logic 0) or to the positive potential (i.e. logic 1).

Up-down counter 52 is started by a logic 0 pulse appearing on load input 44 and being followed by a constant logic 1 state (i.e. signal ENC). Counter 52 then begins counting, commencing from the number applied to its data input 62. It counts up one for each transition from a logic 0 to a logic 1 applied to its up input 54 (as long as input 57 remains at a logic 1). When the maximum count is reached (i.e. 255) the carry output 58 produces a logic 0 which is sent to inverter 70.

Backtracking a little, assume that the maximum count has not yet been reached and the value of A and B' change such that A1≦B1. Then output signal 51 becomes a logic 0 and the output of NAND gate 53 applied to up input 54 is a constant logic 1. The output of NAND gate 56, applied to down input 57 alternates between logic 1 and logic 0, and consequently counter 52 counts down. Note that input A of NAND gate 56 is the clock signal, input B is the inverse of signal 51 (i.e. a logic 1 signal) and assuming X>Y, then input C is a logic 1 signal; consequently the output of NAND gate 56 alternates between logic 0 and logic 1 (and consequently counter 52 counts down).

Magnitude comparator 64 is used to ensure that counter 52 does not count down too far. A minimum count (i.e. 191, or 64 down from the maximum, in this embodiment) is applied to input Y of comparator 64 via eight SPDT switches referenced collectively as switches 66. The count from counter 52, taken from count output 67, is applied to input X of comparator 64. As long as the input on X is larger than the input of Y, (i.e. X>Y) the output on terminal 65 of comparator 64 will be a logic 1; otherwise it will be a logic 0. Consequently, when the input on X equals the input on Y, of comparator 64, output terminal 65 becomes a logic 0, the output of NAND gate 56 becomes a constant logic 1, and the down count stops. Once A1>B1, signal 51 once again becomes a logic 1, and the up count can recommence.

Figure 4:
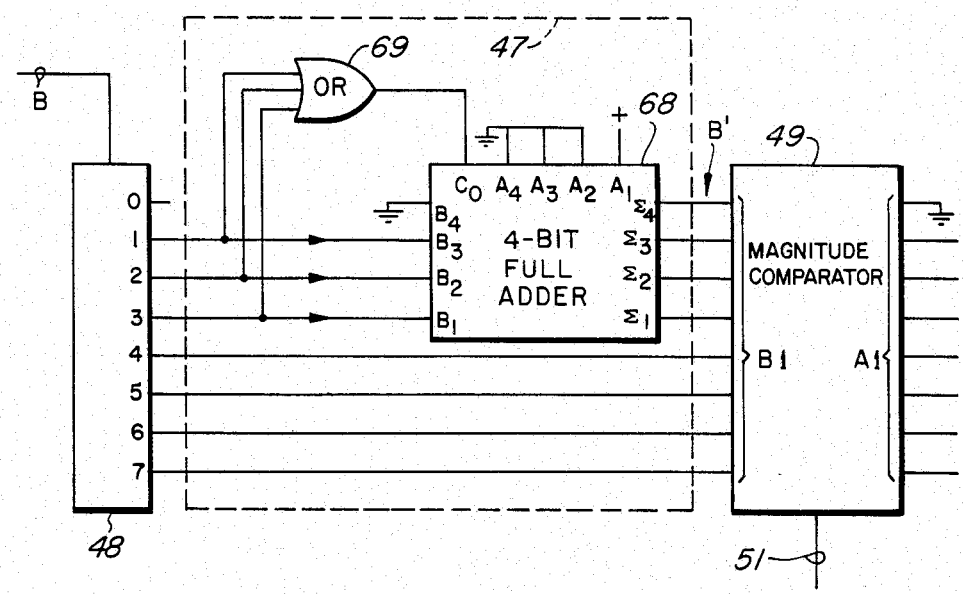
FIG. 4 is a simplified block diagram of the modifier circuit in FIG. 3.

FIG. 4 depicts modifier 47 of FIG. 3, and its interconnection between shift register 48 and magnitude comparator 49. The devices are interconnected as shown in FIG. 4 and attention is directed thereto. The most significant bit of the PCM word is the sign bit and is not used in the comparison; this bit is indicated as bit 0 in shift register 48. Modifier 47 is based upon a 4-bit full adder 68 (e.g. Texas Instrument SN7483A).

OR gate 69 receives on its three inputs, bits 1, 2, and 3 of the PCM word (which indicate the segment number of the PCM word). To provide a switching threshold, the absolute magnitude of signal B is incremented by either one or two segments before comparision with the absolute magnitude of signal A. Signal B is incremented by only one segment if its PCM magnitude falls in the first segment (i.e. bits 1, 2 and 3 are all logic 0's) and by two segments if its PCM value falls in any of the other seven segments (note that maximum amplitude is a PCM word with all logic 1's). Note also that for adder 68, $A_1$ is the least significant bit of the A inputs, $B_1$ is the least significant bit of the B inputs, and $\Sigma_1$ is the least significant bit of the $\Sigma$ outputs. Note also that the plus (+) input to $A_1$ represents a logic 1, and the ground inputs to $B_4$, $A_2$, $A_3$, and $A_4$ represent a logic 0. As a first alternative for modifier 47, a suitably programmed ROM (Read Only Memory) addressed by the seven magnitude bits from register 48 could be employed. A second alternative is to omit modifier 47 altogether so that the absolute magnitudes of signals A and B are compared by comparator 49.

Figure 5:
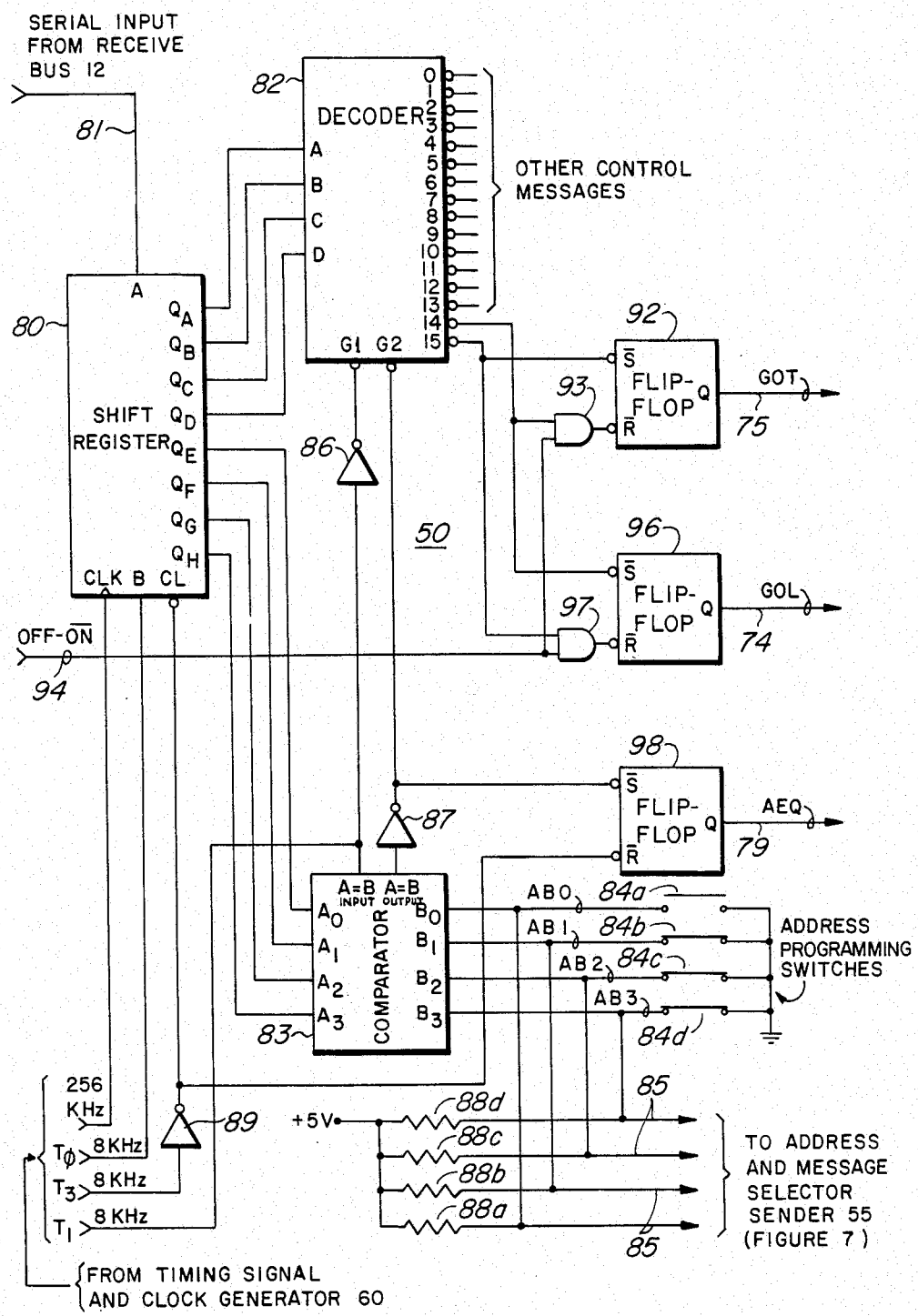
FIG. 5 is a simplified block diagram depicting the circuitry of the address and message receiver-decoder of FIG. 2.

FIG. 5 depicts, in simplified form, address and message receiver-decoder 50. Digital control signals from receive TDM bus 12 are received in serial fashion by shift register 80 (e.g. a T.I. SN74164) via line 81. Four bits from the 8-bit word are applied to decoder 82 (e.g. a T.I. SN74154). These four bits are the "message" or control bits and are decoded into one of sixteen mutually exclusive outputs when input terminals G1 and G2 are both at logic 0.

The remaining four bits stored in register 80 are the "address" bits and are applied to 4-bit magnitude comparator 83 (e.g. A T.I. SN7485). Address programming switches 84a, 84b, 84c, and 84d (referred to collectively as switches 84) determine the address for each individual telephone set 10. As shown in FIG. 5, switches 84 are set to give the address 1000 (in binary format). If the address bits applied to input terminals A0, A1, A2, and A3 of comparator 83 are the same as the address bits AB0, AB1, AB2, and AB3 applied to input terminals B0, B1, B2, and B3, respectively of comparator 83, then the output terminal A=B is a logic 1 (if input terminal A=B is also a logic 1). This results in logic 0 being applied to input terminals G1 and G2 of decoder 82 via inverters 86 and 87 respectively, resulting in the activation (or enabling) of decoder 82. Resistors 88a, 88b, 88c, and 88d are referred to as "pull-up" resistors to provide a logic 1 (i.e. +5 volts) at terminals B0 to B3 of comparator 83 when a switch 84 is open, or to provide a logic 0 (i.e. 0 volts) at terminals B0 to B3 of comparator 83 when a switch 84 is closed. The address bits AB0, AB1, AB2, and AB3 are also applied to address and message selector-sender 55 (FIG. 7) as indicated, via address bus 85.

Timing signal T3 is inverted by inverter 89. Timing signals T1 and T0 are applied as shown and a clock signal with a frequency of 256 KHz is applied to the clock input of shift register 80.

The first fourteen outputs (i.e. terminals 0 to 13 inclusive) of decoder 82 are control signals employed for purposes other than the extension service of the present invention (e.g. loop control commands such as timeslot assignment, loop back for maintenance purposes, etc.). For the present application, only two control signals, from terminals 14 and 15 of decoder 82 are employed. These two signals from decoder 82 (from terminals 14 and 15) are applied to $\overline{S}-\overline{R}$ latch 92; note that the signal from terminal 14 is applied via AND gate 93, the other input of which is an OFF-ON signal 94 (which is a logic 1 signal for off-hook and a logic 0 signal for on-hook). The output of latch 92 is the logic signal GOT which is a logic 1 for "Go into the Talking state" (i.e. become active) and a logic 0 otherwise.

Likewise, the same two signals from decoder 82 (from terminals 14 and 15) are applied to $\overline{S}-\overline{R}$ latch 96; note that the signal from terminal 15 is applied via AND gate 97, the other input of which is OFF-ON signal 94. The output of latch 96 is the logic signal GOL which is a logic 1 for "Go into the Listening state" (i.e. become passive) and a logic 0 for don't go into the listening state (i.e. remain in the active state). Note that terminal 14 of decoder 82 goes to a logic 0 when a command is received, from switching office 11, to become "passive" and terminal 15 of decoder 82 goes to a logic 0 when a command is received, from switching office 11 to become "active". The command to become passive (on terminal 14) sets latch 96 (i.e. produces GOL) and resets latch 92 if it was set. Similarly the command to become active (on terminal 15) sets latch 92 and resets latch 96. Both latches 96 and 92 are reset when telephone set 10 is returned to the "on-hook" state (i.e. off-on signal 94 is a logic 0).

Finally, two signals, one from the output of inverter 87 and one from the output of inverter 89 are applied to $\overline{S}-\overline{R}$ latch 98. The output of latch 98 is the logic signal AEQ which is a logic 1 for "Address equals set address" and a logic 0 for address doesn't equal set address.

Figure 6:
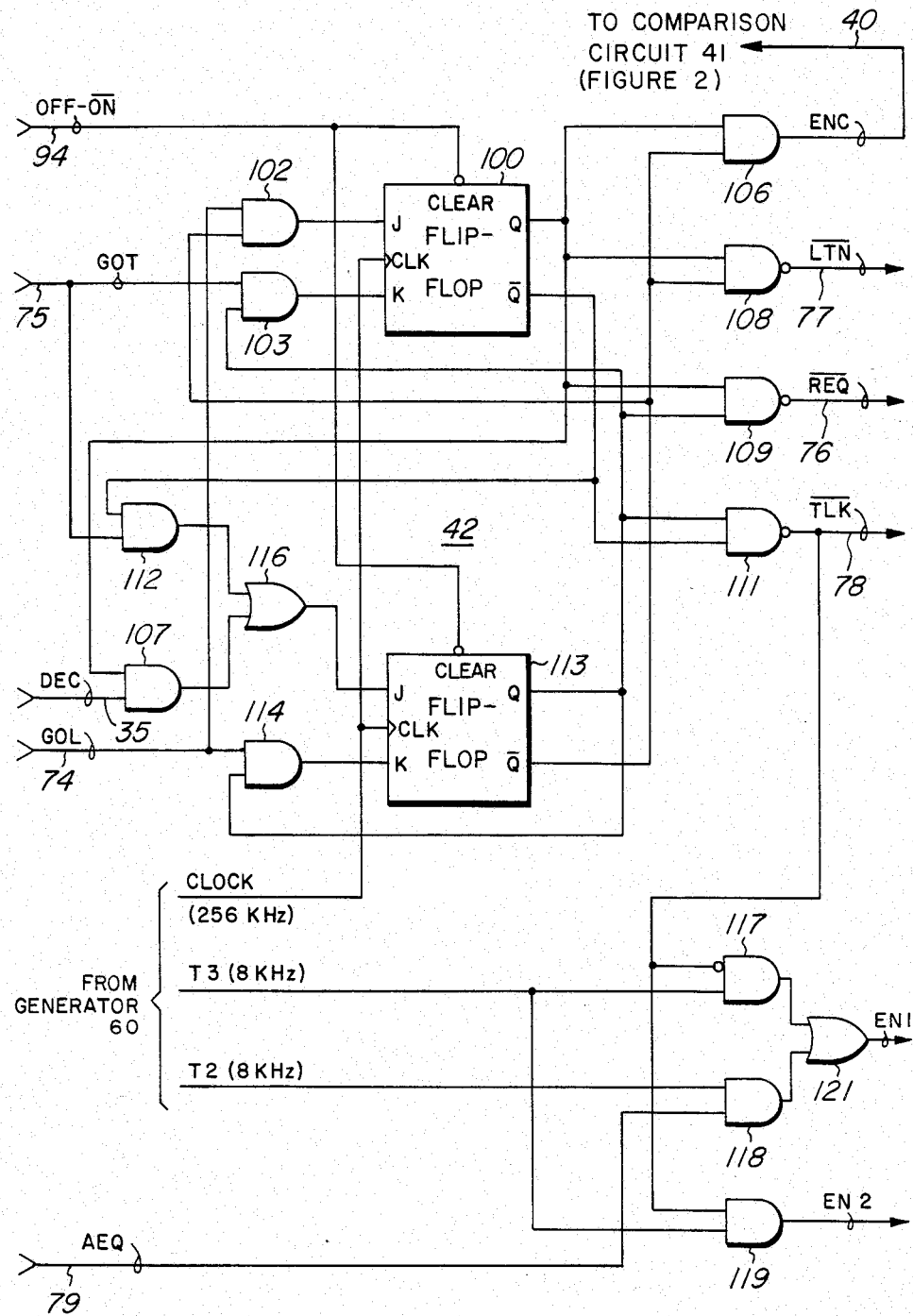
FIG. 6 is a simplified block diagram depicting the circuitry of the talk-listen state controller in FIG. 2.

FIG. 6 depicts the circuitry, in simplified form, of Talk-listen state controller 42. The circuitry is interconnected as depicted in FIG. 6 and attention is directed thereto. J-K flip-flop 100 (e.g. T.I. SN74LS73) is cleared by the OFF-ON signal 94 and is clocked by a 256 KHz clock signal applied to its clock input.

Similarly, J-K flip-flop 113 (e.g. T.I. SN74LS73) is cleared by the OFF-ON signal 94 and is clocked by a 256 KHz clock signal applied to its clock input.

To illustrate the operation of talk-listen state controller 42, assume for exemplary purposes that the telephone set 10 under consideration is off-hook (i.e. OFF-ON is a logic 1). Assume also that there is another telephone set 10 as an extension that is off-hook. The other signals are as follows: GOT is a logic 1; DEC is a logic 1; GOL is a logic 0; and AEQ is a logic 1.

When off-on signal 94 becomes a logic 1, flip-flops 100 and 113 are activated. Initially (when the Q output of both flip-flops 100 and 113 was logic 0), the logic signal ENC was a logic 0; $\overline{LTN}$ was a logic 1; $\overline{REQ}$ was a logic 1; and $\overline{TLK}$ was a logic 1. The output of OR gate 121 (i.e. EN1) was the same as waveform T2 and the output of AND gate 119 was the same as waveform T3. Note that the input to gate 117 is either T1 or T3 depending upon the channel assignments; for the assignments indicated, the input to gate 117 is T3.

Because of the signals initially applied to them, the output of AND gates 102 and 103 were both logic 0 signals. This means that the signals now being applied to the J and K inputs of flip-flop 100 are logic 0's. This results in the Q output remaining at a logic 0 (as initially).

However, the logic signal that has been applied (all along) to the J input of flip-flop 113 is a logic 1 signal, and now that the clear input of flip-flop 113 is receiving a logic 1 signal, flip-flop 113 is activated and produces a logic 1 signal on its Q output (and consequently a logic 0 signal on its $\overline{Q}$ output). This has no effect on the signals ENC, $\overline{LTN}$ and $\overline{REQ}$, as they stay as they were at logic 0, 1 and 1 respectively. Signal $\overline{TLK}$ becomes a logic 0 since the two inputs to NAND gate 111 are both logic 1's. Signal EN1 becomes the combination of waveforms T2 and T3 and signal EN2 becomes a constant logic 0. The output of AND gate 103 becomes a logic 1 (applied to the K input of flip-flop 100), but this does not change the outputs of flip-flop 100.

The operation of flip-flops 100 and 113 and associated signals can be summarized as shown in FIG. 11.

Figure 7:
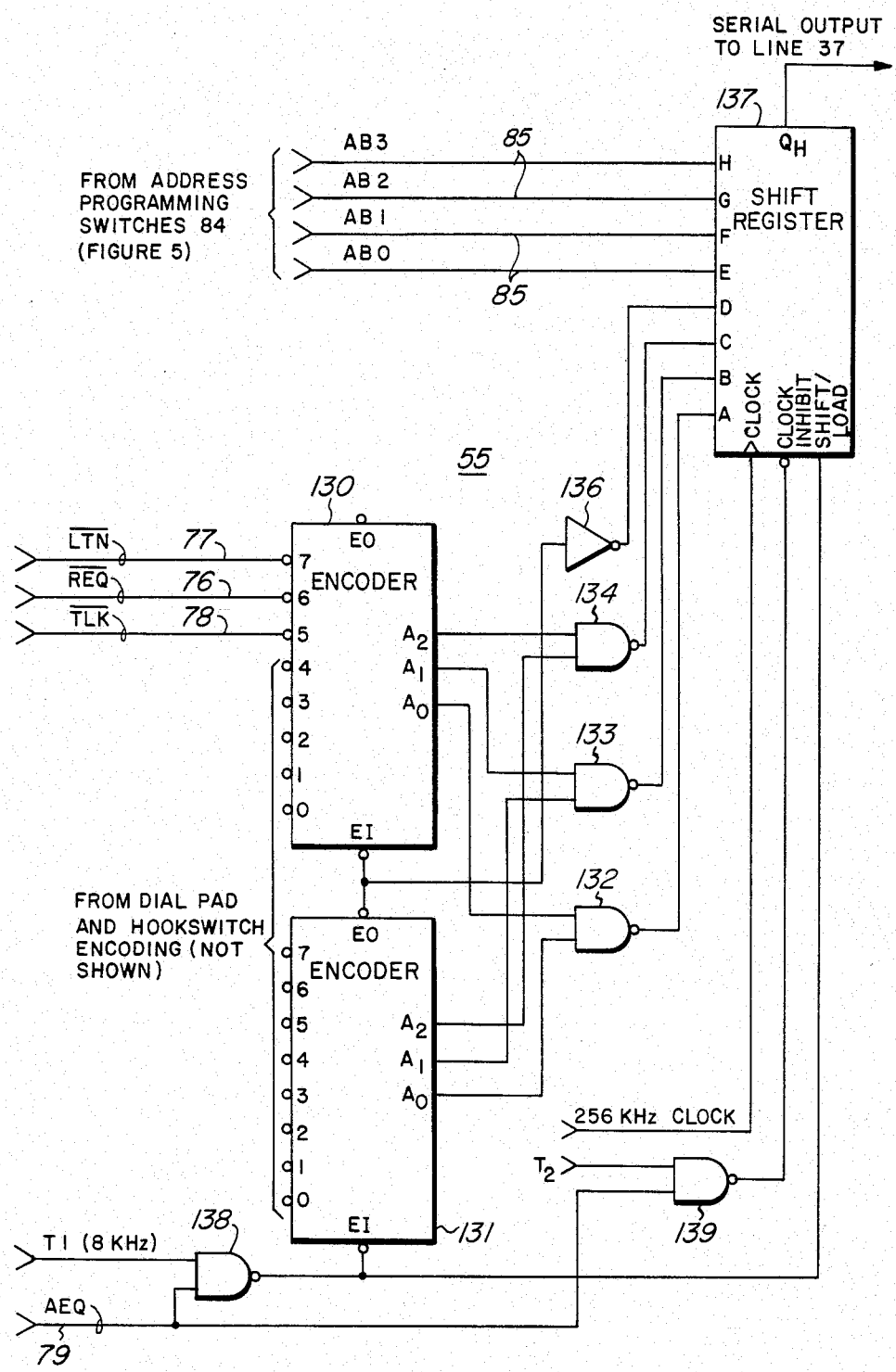
FIG. 7 is a simplified block diagram depicting the circuitry of the address and message selector-sender of FIG. 2.

FIG. 7 depicts the circuitry of address and message selector-sender 55, in simplified form. Encoders 130 and 131 (e.g. T.I. SN74148) receive logic signals on their input terminals 0 to 7 that are encoded as a three bit binary signal on their output terminals A0, A1, and A2. Encoder 130 is responsive to the logic signals $\overline{LTN}$, $\overline{REQ}$, and $\overline{TLK}$ on its input terminals 7, 6, and 5, respectively. Encoder 130 is also responsive to (as is Encoder 131) the signals from the dial pad (not shown) and the hookswitch (not shown). The logic signals on the output terminals of Encoders 130 and 131 are combined by NAND gates 132, 133, and 134 and by inverter 136, as shown. The outputs of NAND gates 132, 133, and 134 along with the output of inverter 136 are applied to the A, B, C, and D inputs, respectively, of parallel-load eight-bit shift register 137 (i.e. a T.I. SN74165). The inputs E, F, G, and H of register 137 receive the address bits AB0, AB1, AB2, and AB3, respectively, from FIG. 5. This information is outputted, in serial fashion, from output terminal QH of register 137. A 256 KHz clock signal is applied to the clock input of register 137.

Timing signal T1 along with logic signal AEQ (on line 79) are applied to NAND gate 138, the output of which is applied to the EI input of Encoder 131 and to the shift/load input of register 137. Timing signal T2 along with logic signal AEQ are applied to NAND gate 139, the output of which is applied to the clock inhibit terminal of register 137.

When AEQ is a logic 1 signal (i.e. address equals set address) the output of NAND gate 138 is the inverse of the timing signal T1 applied to its other input. Similarly, when AEQ is a logic 1 the output of NAND gate 139 is the inverse of the timing signal T2 applied to its other input. When AEQ is a logic 0 signal the output of both NAND gates 138 and 139 is a constant logic 1.

FIG. 8 depicts the waveforms T0, T1, T2, and T3 along with the signals appearing on receive bus 12 and transmit bus 13. The signals appearing on receive bus 12 (FIG. 8a) take the format of four timeslots that keep repeating. The first timeslot, in each group of four, contains a four bit address code indicated as A, B, or C (to address one of the extension telephones 10, in FIG. 1) and a four bit control word, indicated as CW, to be acted upon by the addressed extension (this is referred to as signalling). The next timeslot contains a PCM word, indicated as PCM, sent from the switching office, that contains digitally encoded voice data (i.e. "information") to be received by all the extensions 10a, 10b, and 10c (FIG. 1). The remaining two timeslots are not employed. This four timeslot cycle repeats itself, the only difference the second time being that the first timeslot now contains the address of a different extension (e.g. address B for extension telephone 10b). Likewise this four timeslot cycle is repeated a third time with the first timeslot now containing the address of the remaining extension (e.g. address C for extension telephone 10c). The fourth repetition of the four timeslot cycle commences once again with the address A (for extension telephone 10a) and the process repeats itself.

In effect what is happening on receive bus 12 is that each extension telephone 10a, 10b, and 10c is being "polled" (or instructed) by switching office 11 (FIG. 1) in turn. The instructions sent to each extension 10 via the control word (CW) include the commands to go into or to remain in the listening mode (i.e. to be passive) or to go into or to remain in the talking mode (i.e. to be active). The information contained in the PCM signal represents digitally encoded voice signals and will of course be changing every 125μ seconds.

The signals on transmit bus 13 (FIG. 8b) follow the same format as those in FIG. 8a except that the first two timeslots in each group of four timeslots are not used. The third timeslot in the group of four contains a four bit address, indicated as A, (generated by extension telephone 10a, to which that address belongs) and a four bit control word (CW) generated by that same extension telephone 10a (i.e. "signalling"). This control word CW conveys to the switching office information regarding whether or not that extension wishes to become active or information regarding the status of that extension, i.e. whether it is in the active or passive state, is on-hook or off-hook, etc. The fourth timeslot in the group contains an eight bit PCM word representing a digitally encoded voice signal (i.e. "information"). This PCM word emanates from the extension telephone 10 that is in the active mode, which may or may not have the address A (i.e. may or may not be telephone 10a). This four timeslot group is repeated a second time with extension telephone 10b (address B) replacing the extension with address A. Likewise the group is repeated a third time for address C (extension telephone 10c) and then repeats the complete cycle recommencing with address A. Note that if more digital station apparatus (i.e. telephone sets or data terminals) have access to the same bus, the polling cycle is extended. Using four binary address bits a total of sixteen terminals could be connected to a single bus. In this instance the terminals A, B, and C would be polled once every sixteen frames instead of once every three frames.

Figure 9:
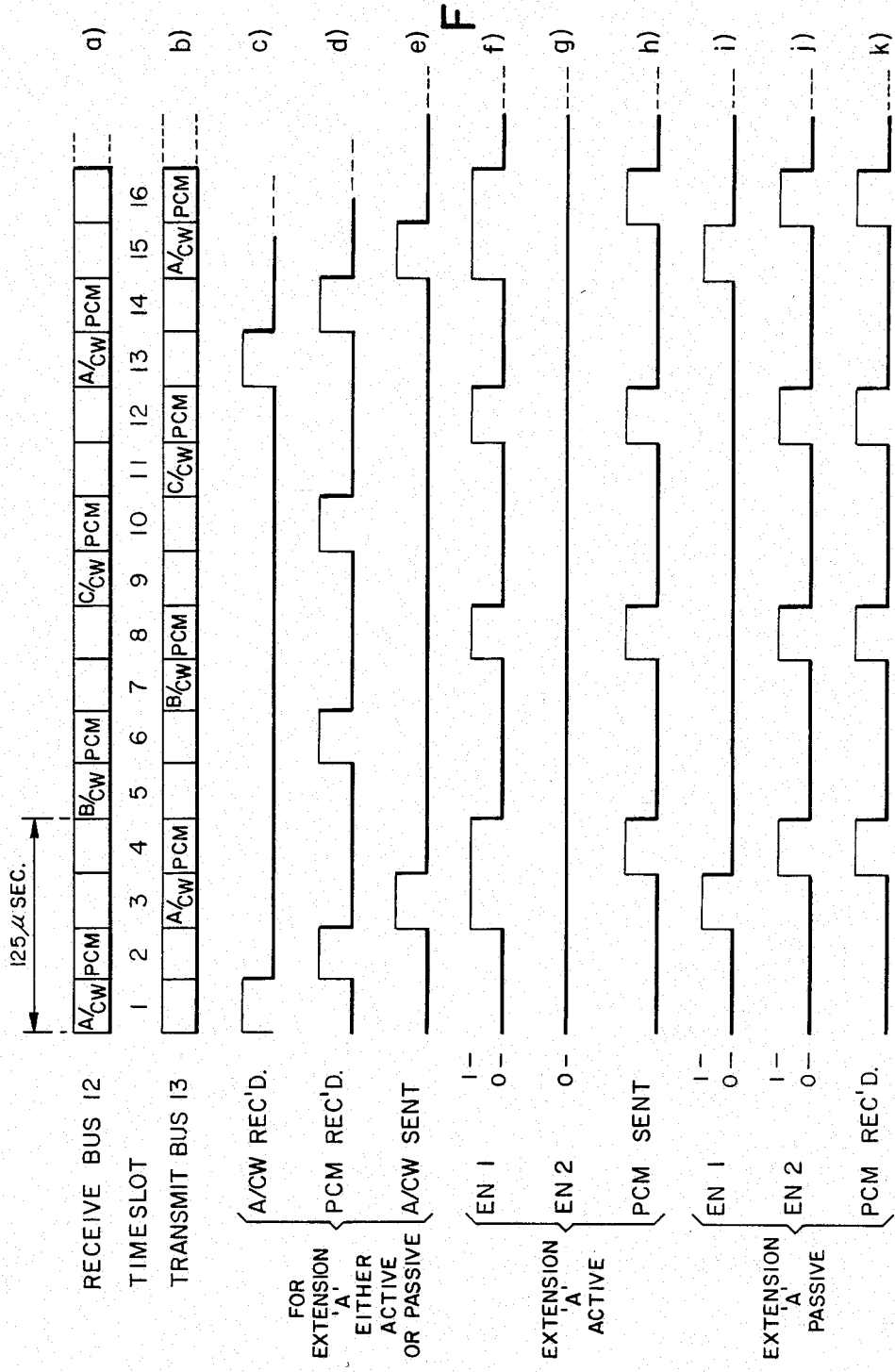
FIG. 9 is a timing diagram depicting various signals useful for a better understanding of the invention.

FIG. 9 serves to illustrate more completely the timing of the signals. FIGS. 9a and 9b duplicate the receive bus 12 signals and transmit bus 13 signals of FIGS. 8a and 8b respectively. The timeslots on these two buses have been numbered 1 to 16 for ease of reference. FIG. 9 depicts the signals of telephone set 10a (i.e. address A).

FIGS. 9c, 9d, and 9e depict the signals for address A that occur regardless of whether telephone set 10a is active or passive. In timeslot 1 the address A along with control word CW is received (from receive bus 12); this also happens in timeslot 13 (FIG. 9c). In timeslot 2 a PCM word originating with switching office 11 (FIG. 1) is received (from receive bus 12); this also happens in timeslots 6, 10, and 14. In timeslot 3, extension telephone A sends its address (i.e. A) and a control word (i.e. CW) to switching office 11 (FIG. 1) on transmit bus 13; this is repeated in timeslot 15, with CW changed in accordance with the status of telephone A at that time.

FIGS. 9f, 9g, and 9h depict the signals for address A that occur when extension telephone 10a is active. Signal EN1 (recall that this signal controls the application of PCM signals from telephone extension 10 to transmit bus 13; i.e. it is a logic 1 when the extension is transmitting; see FIG. 2) is a logic 1 during timeslots 3 and 4. This enables the address and control word as well as the PCM signal from extension telephone 10a to be transmitted. Signal EN1 is also a logic 1 during timeslots 8 and 12 to allow the PCM signal from telephone 10a to be transmitted via transmit bus 13. During timeslot 15 signal EN1 is once again a logic 1 to once more transmit the address A and control word CW from extension telephone 10a; during timeslot 16 signal EN1 is a logic 1 to transmit the PCM signal.

Since telephone 10a is active, signal EN2 (FIG. 9g) is at a continuous logic 0 level. This occurs so that telephone 10a does not recieve its own signals from transmit bus 13. FIG. 9h depicts the time periods that PCM information from extension telephone 10a is sent on transmit bus 13; namely timeslots 4, 8, 12, and 16.

FIGS. 9i, 9j, and 9k depict the signals for address A that occur when extension telephone 10a is passive. Signal EN1 (FIG. 9i) is a logic 1 signal only during timeslots 3 and 15. That is, only when extension telephone 10a is transmitting its address A and control word CW to switching office 11 (FIG. 1) via transmit bus 13, is EN1 a logic 1. Signal EN2 is a logic 1 signal during timeslots 4, 8, 12 and 16. That is, every time there is a PCM signal on transmit bus 13, from one of the other extension telephones 10, signal EN2 goes to a logic 1 level to enable extension telephone 10a to receive the PCM signals transmitted by another extension telephone 10. FIG. 9K depicts the timing of the PCM signals received from the other telephone extensions 10; this is of course the saae waveform as signal EN2 of FIG. 9j.

Figure 10:
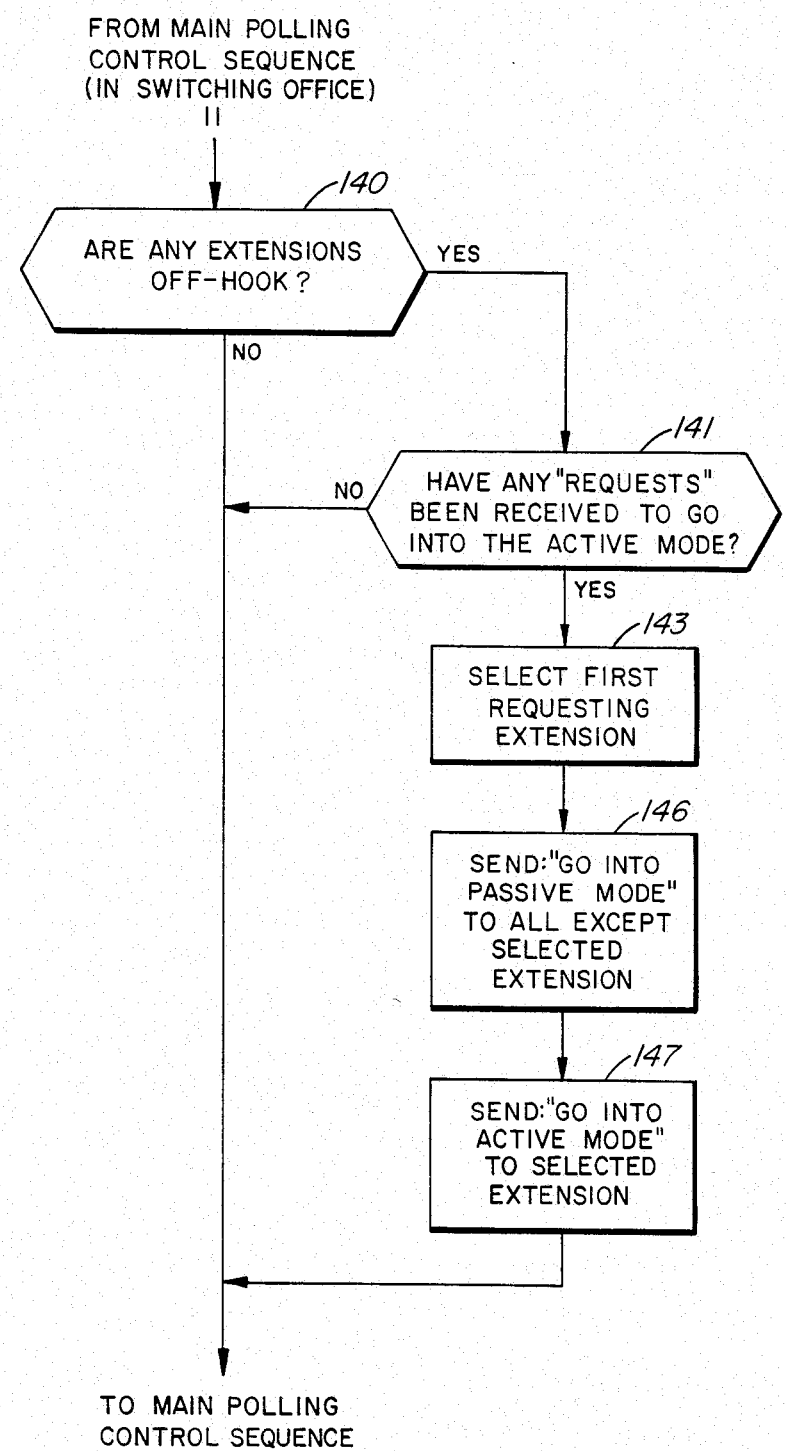
FIG. 10 is a flow chart depicting the additional functions that are performed by switching office 11 in FIG. 1.

FIG. 10 is a flow chart depicting the additional functions that must be performed by switching office 11 (FIG. 1). Decision block 140 queries whether or not any extensions (i.e. telephone sets 10a, 10b, or 10c) are off-hook. If the answer is no, then the main polling control sequence, as is usually performed by switching office 11 is followed.

If the answer from decision block 140 is yes, then decision block 141 is accessed. Decision block 141 queries whether or not there is a request, to enter the active mode, pending from any extension telephone sets 10. If the answer for block 141 is no, then the main polling control sequence is re-entered directly.

If the answer from block 141 is yes, then block 143 is accessed to select the first requesting extension to go into the active mode; then action block 146 is accessed.

Action block 146 instigates the sending of the message to go into the passive mode to all extension telephones 10 except that extension telephone 10 that has been "selected".

Then action block 147 is accessed. Block 147 sends the message to go into the active mode to the "selected" extension telephone 10. The main polling control sequence is then re-entered.

What is claimed is:

1. A digital station apparatus for connection to a subscriber's digital telephone loop, having both receive channels and transmit channels, said apparatus characterized by:
  terminal means for receiving digital signals from said receive channels;
  first switch means for selectively passing first digital signals from a first channel of said transmit channels;
  second switch means for selectively passing second digital signals to said first channel of said transmit channels such that said first and second switch means operate in unison and one said switch means is open when the other said switch means is closed; and a comparison means for comparing said first digital signals and said second digital signals, when said first switch means is closed, and for producing a signal indicative of said comparison.

2. The digital station apparatus of claim 1 wherein said comparison means is responsive both to the absolute magnitude of the first digital signals and to the absolute magnitude of the second digital signals and counts, in a first direction, the number of times that the absolute magnitude of said second digital signals exceeds the absolute magnitude of said first digital signals by a predetermined amount and counts in a second direction, to a predetermined limit value, the number of times that it doesn't, producing an output signal indicative of the accumulative count reaching a predetermined limit value in said first direction.

3. The digital station apparatus of claim 1 further including:
receiver means both for receiving and for decoding digital signals from a second channel of said receive channels;
control means, responsive both to said comparison means and to said receiver means, for controlling said first switch means and said second switch means, for enabling said comparison means, and for producing an indication of the status of said apparatus;
sender means, responsive to said control means, for selectively applying a digital signal to a second channel of said transmit channels, via said second switch means.

4. The digital station apparatus of claim 3 wherein said comparison means is responsive both to the absolute magnitude of the first digital signals and to the absolute magnitude of the second digital signals and counts up the number of times that the absolute magnitude of said second digital signals exceeds the absolute magnitude of said first digital signals by a predetermined amount and counts down, to a predetermined minimum value, the number of times that it doesn't, producing an output signal indicative of the accumulative count reaching a predetermined maximum value.

5. The digital station apparatus of claim 1, 2, or 4 wherein said station apparatus is a telephone set.

6. The digital station apparatus of claim 2, 3, or 4 further including a first digital to analogue converter means selectively responsive to said digital signals from said receive channels, and a second digital to analogue converter means responsive to said first digital signals from said first channel of said transmit channels, and a summing means for summing the output signals of said first and second converter means so as to produce a composite analogue signal.

7. A digital station apparatus for connection to a subscriber's digital telephone loop having a receive bus and a transmit bus, said apparatus characterized by:
a first converter means for selectively converting digital signals, on said receive bus, into a first analogue signal;
a second converter means for selectively converting first digital signals, from a first channel of said transmit bus, into a second analogue signal;
a summing means for summing the first and second analogue signals from said first and said second converter means so as to produce a composite analogue signal;
a third converter means for converting a third analogue signal into second digital signals for selective application to said first channel of said transmit bus; and
a comparison means for selectively comparing said first digital signals and said second digital signals and for producing a signal indicative of said comparison.

8. The digital station apparatus of claim 7 wherein said comparison means is responsive to the absolute magnitudes of the first and second digital signals and counts up the number of times that the absolute magnitude of said second digital signals exceeds the absolute magnitude of said first digital signals by a predetermined amount and counts down, to a predetermined minimum value, the number of times that it doesn't, producing an output signal indicative of the accumulative count reaching a predetermined maximum value.

9. The digital station apparatus of claim 8 wherein said predetermined amount is zero.

10. The digital station apparatus of claim 8 wherein said predetermined amount represents approximately a ten decibel difference in equivalent analogue signal level.

11. A digital telephone multi-set system for connection to a subscriber's digital telephone loop, having both receive channels and transmit channels, said system comprising:
at least two digital telephone apparatus for connection to said telephone loop;
one said digital telephone apparatus being active for producing a transmit signal on at least a first channel of said transmit channels and for receiving a receive signal from at least a first channel of said receive channels,
the remaining digital telephone apparatus being passive for receiving both said transmit signal from said first channel of said transmit channels, and said receive signal from said first channel of said receive channels; and
all said telephone apparatus including control means for altering the operation of said telephone apparatus so that any one of said telephone apparatus can function as the active digital telephone apparatus and the remaining digital telephone apparatus can function as the passive digital telephone apparatus.

12. The digital station apparatus of claim 11 wherein said receive channels and said transmit channels are time division multiplexed on a single pair of electrical conductors.

13. The system of claim 11 wherein said transmit channels comprise a transmit bus, said receive channels comprise a receive bus, and said transmit bus and said receive bus are each time division multiplex buses.

14. The digital telephone multi-set system of claim 11, 12, or 13 wherein said digital telephone apparatus are digital telephone sets.

15. The digital telephone multi-set system of claim 11, 12, or 13 wherein said digital telephone apparatus are digital telephone sets and are two in number.

16. The digital telephone multi-set system of claim 11, 12, or 13 wherein said digital telephone apparatus are digital telephone sets and are three in number.

17. The system of claim 15 wherein said telephone apparatus are telephone sets and each said telephone set comprises:

a first converter means for selectively converting digital signals, on said receive bus, into a first analogue signal;

a second converter means for selectively converting first digital signals, from said first channel of said transmit channels, into a second analogue signal;

a summing means for summing the first and second analogue signals from said first and said second converter means so as to produce a composite analogue signal;

a third converter means for converting a third analogue signal into second digital signals for selective application to said first channel of said transmit channels; and a comparison means for selectively comparing said first digital signals and said second digital signals and for producing a signal indicative of said comparison.

18. The system of claim 17 wherein said comparison means is responsive to the absolute magnitudes of the first and second digital signals and counts up the number of times that the absolute magnitude of said second digital signals exceeds the absolute magnitude of said first digital signals by a predetermined amount and counts down, to a predetermined minimum value, the number of times that it doesn't, producing an output signal indicative of the accumulative count reaching a predetermined maximum value.

19. The system of claim 18 wherein an additional communication link, for said system, comprises a second channel of said transmit channels and a second channel of said receive channels.

20. A method of controlling each of a plurality of telephone apparatus connected to a subscriber's digital telephone loop, having both receive channels and transmit channels, said method, at each said apparatus, comprising the steps of:

receiving digital signals from said receive channels;

selectively passing first digital signals from a first channel of said transmit channels to said apparatus;

selectively passing second digital signals from said apparatus to said first channel of said transmit channels;

selectively comparing said first digital signals and said second digital signals and producing a signal indicative of said comparison.

21. The method of claim 20 further including the step of:

selectively passing a control signal, in response to said signal indicative of said comparison, from said apparatus to a second channel of said transmit channels.

22. The method of claim 20 or 21 wherein the step of selectively comparing said first digital signals and said second digital signals comprises the step of:

comparing the absolute magnitude of said first digital signals to the absolute magnitude of said second digital signals;

changing, in a first direction, the count of a counter each time that the absolute magnitude of said second digital signals exceeds the absolute magnitude of said first digital signals by a predetermined amount; changing said count in a second direction, to a predetermined limit value, each time that it doesn't; and producing an output signal indicative of the accumulative count reaching a predetermined limit value in said first direction.

23. A method of controlling a plurality of telephone apparatus connected to a subscriber's digital telephone loop, having both a receive bus and a transmit bus, and wherein at any given time, one said apparatus at most is active and the remainder of said apparatus are passive, said method comprising the steps of:

receiving digital signals from said receive bus at each said telephone apparatus;

passing digital signals from a first channel of said transmit bus to all the passive apparatus;

passing digital signals produced by the active apparatus to said first channel of said transmit bus;

comparing, at each said passive apparatus, said digital signals from said first channel of said transmit bus and digital signals produced by that particular passive apparatus, and selectively transmitting a digital signal on a second channel of said transmit bus indicating the result of said comparison.

24. The method of claim 23 wherein the step of comparing said digital signals from said first channel of said transmit bus and digital signals produced by that particular passive apparatus comprises the steps of: comparing the absolute magnitude of said digital signals from said first channel of said transmit bus to the absolute magnitude of the digital signals produced by that particular passive apparatus;

incrementing the count of a counter each time that the absolute magnitude of said digital signals produced by that particular passive apparatus exceeds, by a predetermined amount, the absolute magnitude of said digital signals from said first channel of said transmit bus;

decrementing said count each time that it doesn't but not beyond a predetermined minimum value; and producing an output signal indicative of the accumulative count reaching a predetermined maximum value.

* * * * *